US008862406B2

United States Patent
Itskovich et al.

(10) Patent No.: US 8,862,406 B2
(45) Date of Patent: Oct. 14, 2014

(54) ELECTRICAL IMAGER OPERATING IN OIL-BASED MUD AND LOW RESISTIVE FORMATION

(75) Inventors: Gregory B. Itskovich, Houston, TX (US); David R. Beard, Houston, TX (US); Fei Le, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 466 days.

(21) Appl. No.: 13/346,263

(22) Filed: Jan. 9, 2012

(65) Prior Publication Data
US 2013/0013210 A1 Jan. 10, 2013

Related U.S. Application Data

(60) Provisional application No. 61/431,664, filed on Jan. 11, 2011.

(51) Int. Cl.
  *G01V 1/40* (2006.01)
  *G01V 3/20* (2006.01)
  *G01V 5/04* (2006.01)

(52) U.S. Cl.
  CPC .................................. *G01V 3/20* (2013.01)
  USPC ......... 702/7; 702/8; 702/9; 702/103; 702/104

(58) Field of Classification Search
  CPC ........ G01F 1/74; G01N 27/02; G01N 27/221; G01N 33/24; G01N 33/2823; G01V 3/34; G01V 5/04; G01V 3/38; G01V 3/20
  USPC ...................... 702/6–11, 103, 104
  See application file for complete search history.

(56) References Cited

U.S. PATENT DOCUMENTS

| 7,365,545 | B2 * | 4/2008 | Itskovich et al. ............. 324/367 |
| 7,385,401 | B2 | 6/2008 | Itskovich et al. |
| 7,394,258 | B2 | 7/2008 | Itskovich et al. |
| 7,397,250 | B2 | 7/2008 | Bespalov et al. |
| 7,896,073 | B2 | 3/2011 | Forgang et al. |

(Continued)

FOREIGN PATENT DOCUMENTS

EP    2148223 A    1/2010

OTHER PUBLICATIONS

International Search Report PCT/US2011/020771.*

*Primary Examiner* — Phuong Huynh
(74) *Attorney, Agent, or Firm* — Mossman Kumar & Tyler PC

(57) ABSTRACT

This disclosure relates to apparatuses and methods for reducing current leakage between a measure electrode and a logging tool body during borehole investigations in an earth formation involving electric current and non-conductive drilling fluid. The apparatus may include one or more transmitters disposed on a pad body, configured to inject an electric current into the earth formation, and coupled to the mandrel and one or more measure electrodes. The measure electrodes may be configured to receive current from the formation and coupled to a back plate of the pad body. The apparatus may be configured to maintain a selected ratio between pad body to logging tool body impedance and transmitters to logging tool body impedance sufficient to reduce current leakage between the earth formation and the logging tool body. The transmitter/mandrel and measure electrode/back plate may be electrically isolated from one another. The method may include using the apparatus.

16 Claims, 10 Drawing Sheets

(56) References Cited

U.S. PATENT DOCUMENTS

| | | |
|---|---|---|
| 7,940,050 B2 | 5/2011 | Bespalov et al. |
| 8,112,228 B2 | 2/2012 | Bespalov et al. |
| 8,232,803 B2 | 7/2012 | Bloemenkamp |
| 2008/0128166 A1* | 6/2008 | Forgang et al. ............ 175/50 |
| 2009/0306896 A1* | 12/2009 | Forgang et al. ............ 702/7 |
| 2010/0039115 A1 | 2/2010 | Bespalov et al. |
| 2011/0204897 A1 | 8/2011 | Hu et al. |
| 2011/0241690 A1 | 10/2011 | Hayman |

* cited by examiner

ELECTRICAL IMAGER OPERATING IN OIL-BASED MUD AND LOW RESISTIVE FORMATION

CROSS-REFERENCES TO RELATED APPLICATIONS

This application claims priority from U.S. Provisional Patent Application Ser. No. 61/431,664, filed on 11 Jan. 2011, the disclosure of which is incorporated herein by reference in its entirety.

FIELD OF THE DISCLOSURE

This disclosure generally relates to exploration for hydrocarbons involving electrical investigations of a borehole penetrating an earth formation. More specifically, this disclosure relates to reducing electric current leakage during borehole investigations involving electric current injected into a wall of the borehole.

BACKGROUND OF THE DISCLOSURE

Electrical earth borehole logging is well known and various devices and various techniques have been described for this purpose. Broadly speaking, there are two categories of devices used in electrical logging devices. In the first category, a transmitter (such as a current electrode) is uses in conjunction with a diffuse return electrode (such as the tool body). A measured electric current flows in a circuit that connects a current source to the transmitter, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure belongs to the first category.

With tools in tools of the first category, it is desirable to have an imaging technique that is minimally affected by formation current leakage to the tool mandrel and tool standoff from the formation, especially, under conditions when formation becomes conductive (below 10 ohmm). Typically, one or more transmitters are disposed on the tool mandrel and impart electrical current into the earth formation. A return current is received from the earth formation by one or more electrodes on a pad. However, at higher frequencies of operation, the standoff distance between the tool mandrel and the earth formation may be sufficiently large as to degrade the quality of the signal received through the return electrode(s) on the pad. Additionally, borehole curvature and diameter may limit the use of some pad configurations due to prohibitively large pad-to-formation standoff distances and/or and inability to convey the pad in the borehole. This disclosure addresses tool configurations for reducing current leakage from the formation to the tool mandrel and reducing the effects of standoff on resistivity imaging.

SUMMARY OF THE DISCLOSURE

In aspects, the present disclosure is related to methods and apparatuses for reducing electric current leakage during borehole investigations involving electric current injected into a wall of the borehole.

One embodiment according to the present disclosure includes an apparatus configured to evaluate an earth formation penetrated by a borehole having a non-conducting fluid therein, the apparatus comprising: a carrier; a logging tool disposed on the carrier, the logging tool comprising: a pad body; at least one transmitter disposed on the pad body; and at least one measure electrode electrically isolated from the at least one transmitter and a body of the logging tool; wherein a ratio between (i) an area of the at least one transmitter and (ii) an area of the at least one measure electrode and a ratio between (i) an impedance between the pad body and the body of the logging tool and (ii) an impedance between the at least one transmitter and the body of the logging tool are both sufficient to reduce a current leakage from the earth formation to the body of the logging tool; and; and a processor configured to estimate a resistivity parameter of the earth formation using an impedance determined from a current at the at least one measure electrode and a potential of the at least one transmitter.

Another embodiment according to the present disclosure includes a method of evaluating an earth formation penetrated by a borehole having a non-conducting fluid therein, the method comprising: conveying a logging tool disposed on a carrier into the borehole, the logging tool comprising: a pad body, at least one transmitter disposed on the pad body, and at least one measure electrode electrically isolated from the at least one transmitter and a body of the logging tool; maintaining a ratio between an impedance between the pad body and the body of the logging tool and an impedance between the at least one transmitter and the body of the logging tool and a ratio between an area of the at least one transmitter and an area of the at least one measure electrode that are both sufficient to reduce a current leakage from the earth formation to the body of the logging tool; receiving an electric current with the at least one measure electrode; and estimating a resistivity parameter of the earth formation using an impedance determined from the electric current and a potential of the at least one transmitter.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

Figure 7:
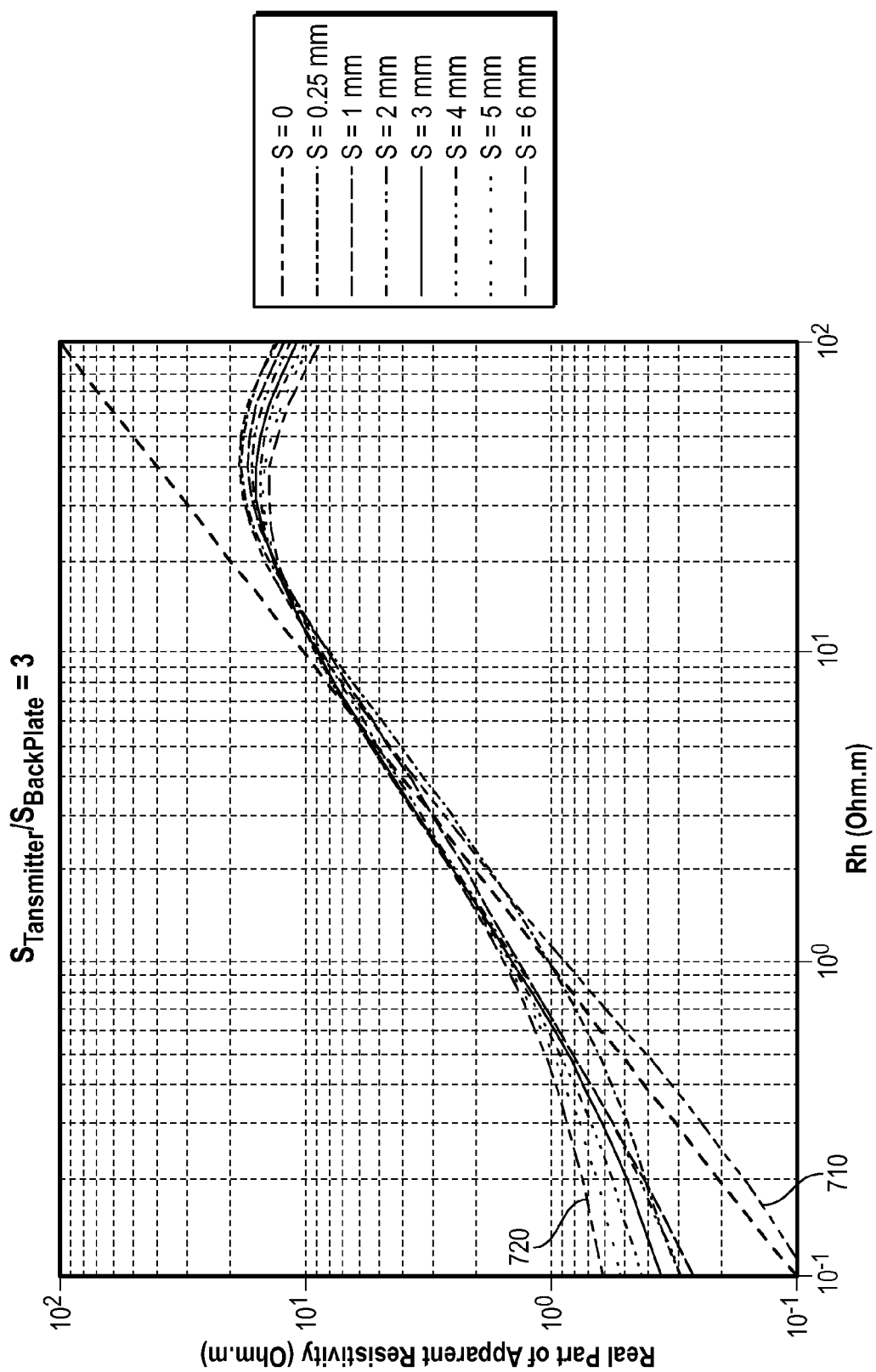
Figure 8:
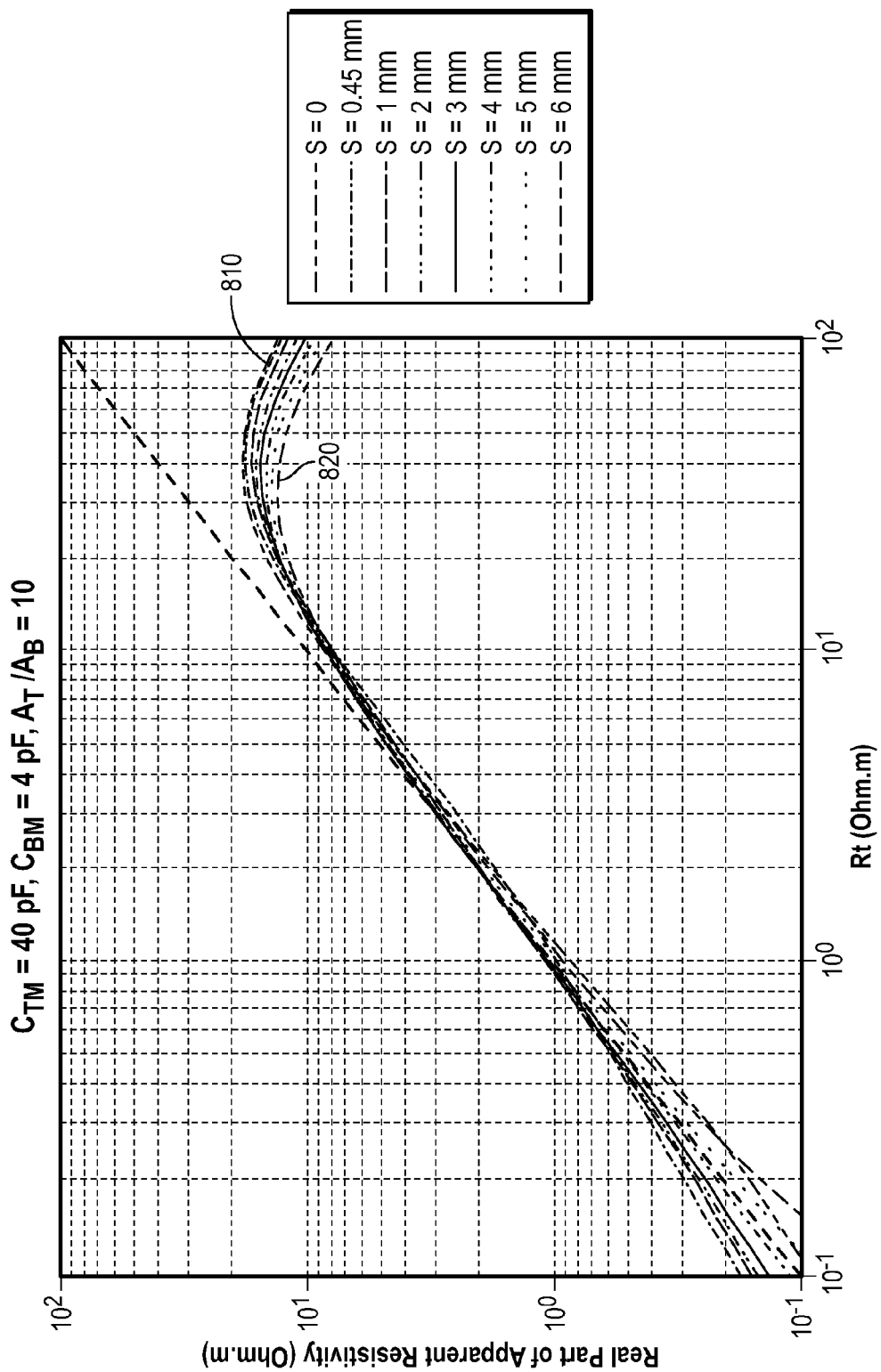
Figure 9:
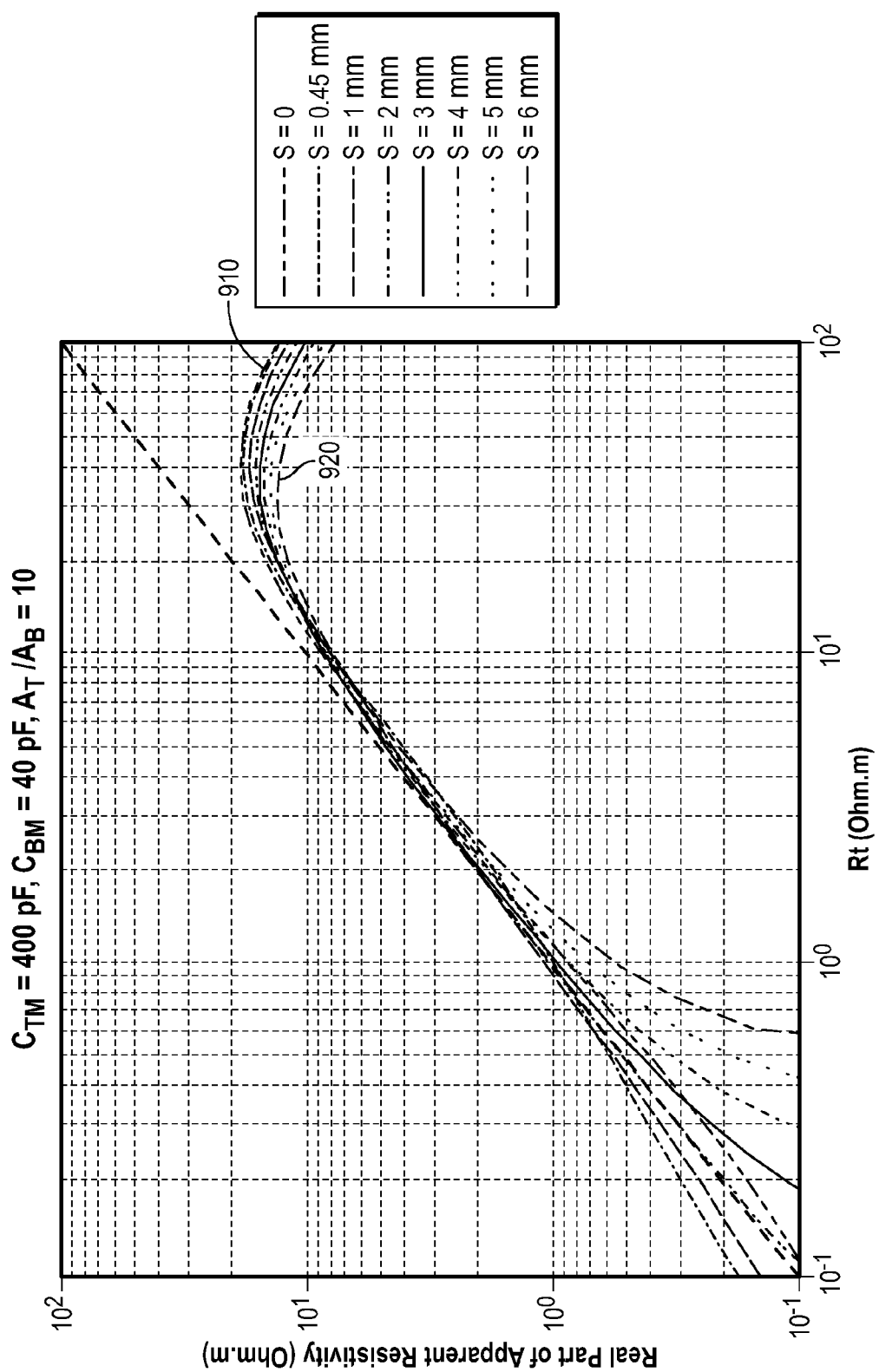
Figure 10:
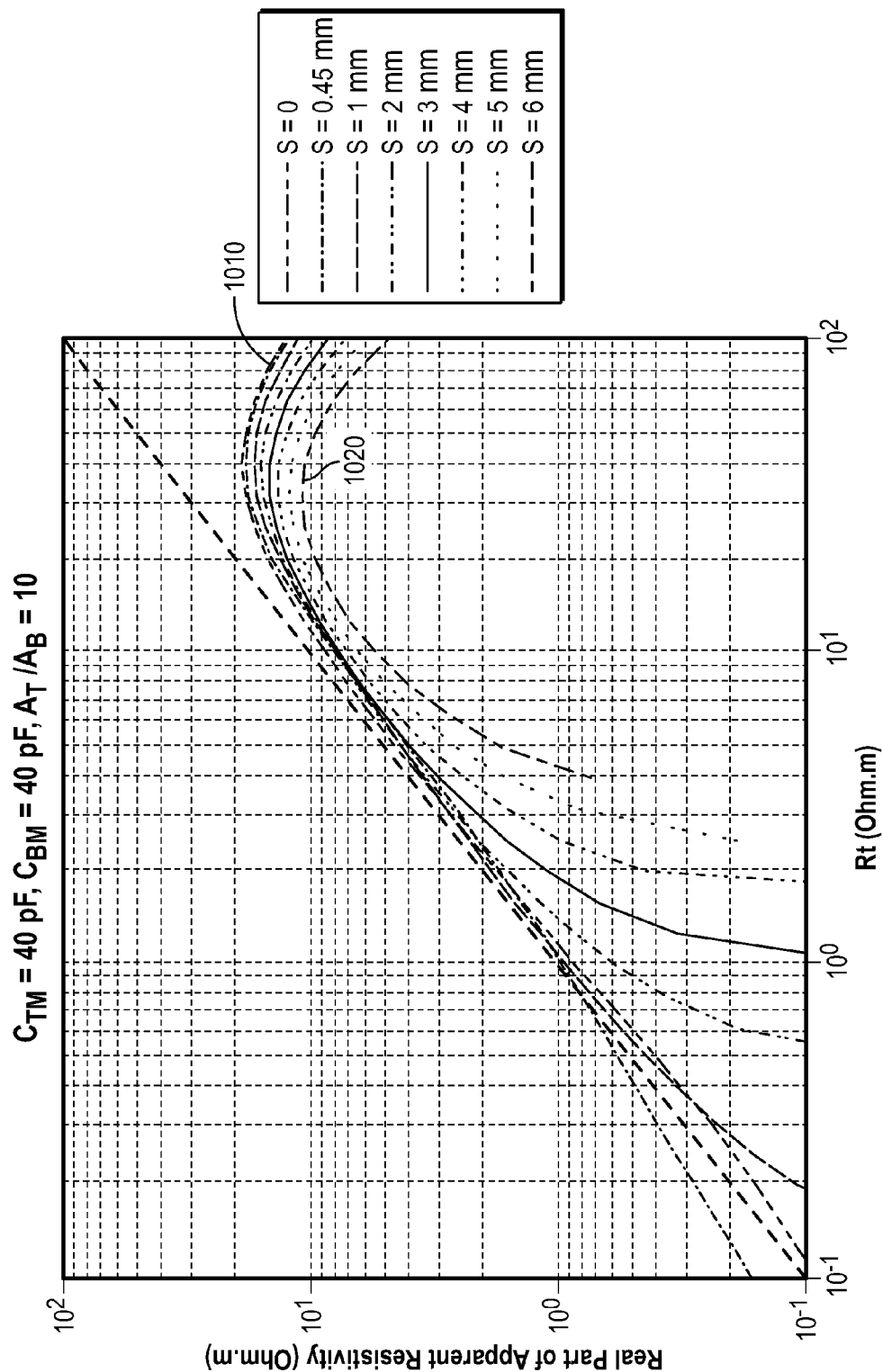

FIG. 7 shows a graph representing the real part of resistivity versus the total resistivity at different standoff distances when the surface area of the on-pad transmitter is about 20 times bigger than the total area of the buttons using one embodiment of the present disclosure;

FIG. 8 shows a graph representing the real part of resistivity versus the total resistivity at different standoff distances when the surface area of the on-pad transmitter is about 10 times bigger than the total area of the buttons and capacitance $C_{TM}$ is about 40 picofarads while capacitance $C_{BM}$ is about 4 picofarads using one embodiment of the present disclosure; and FIG. 9 shows a graph representing the real part of resistivity versus the total resistivity at different standoff distances when the surface area of the on-pad transmitter is about 10 times bigger than the total area of the buttons and the capacitance $C_{TM}$ is about 400 picofarads while capacitance $C_{BM}$ is about 40 picofarads using one embodiment of the present disclosure; and FIG. 10 shows a graph representing the real part of resistivity versus the total resistivity at different standoff distances when the surface area of the on-pad transmitter is about 10 times bigger than the total area of the buttons and the capacitance $C_{TM}$ is about 40 picofarads while capacitance $C_{BM}$ is about 40 picofarads using one embodiment of the present disclosure.

DETAILED DESCRIPTION

This disclosure generally relates to exploration for hydrocarbons involving electrical investigations of a borehole penetrating an earth formation. More specifically, this disclosure relates to reducing electric current leakage during borehole investigations involving electric current injected into a wall of the borehole.

Figure 1:
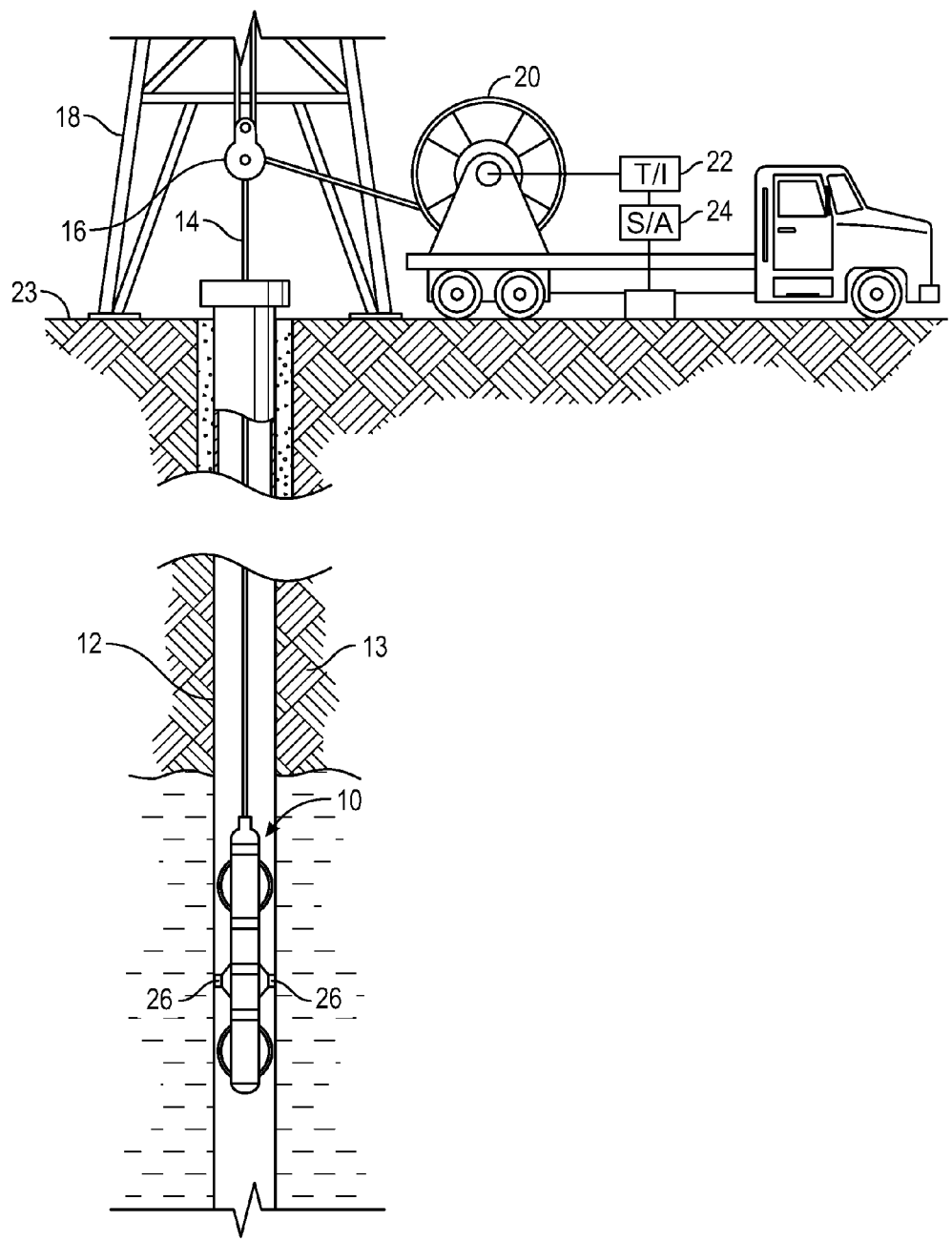
FIG. 1 shows a schematic of an imaging tool deployed in a wellbore along a drill string according to one embodiment of the present disclosure.

FIG. 1 shows an exemplary imaging tool 10 suspended in a borehole 12, which penetrates earth formations such as 13, from a carrier 14 that passes over a sheave 16 mounted on a drilling rig 18. Carrier 14 may be rigid or non-rigid. Imaging tool 10 may be coupled or combined with additional tools. In this example, the tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.).

Imaging tool 10 may be in contact with earth formation 13 when performing various measurement operations. The point of contact may be a resistivity array 26 in contact with the earth formation 13. This resistivity array 26 may be retractable such that, when the resistivity array 26 is not in contact with the earth formation 13, the resistivity array 26 may still be in contact with wellbore drilling fluid 50 that resides within the borehole 12.

Figure 2:
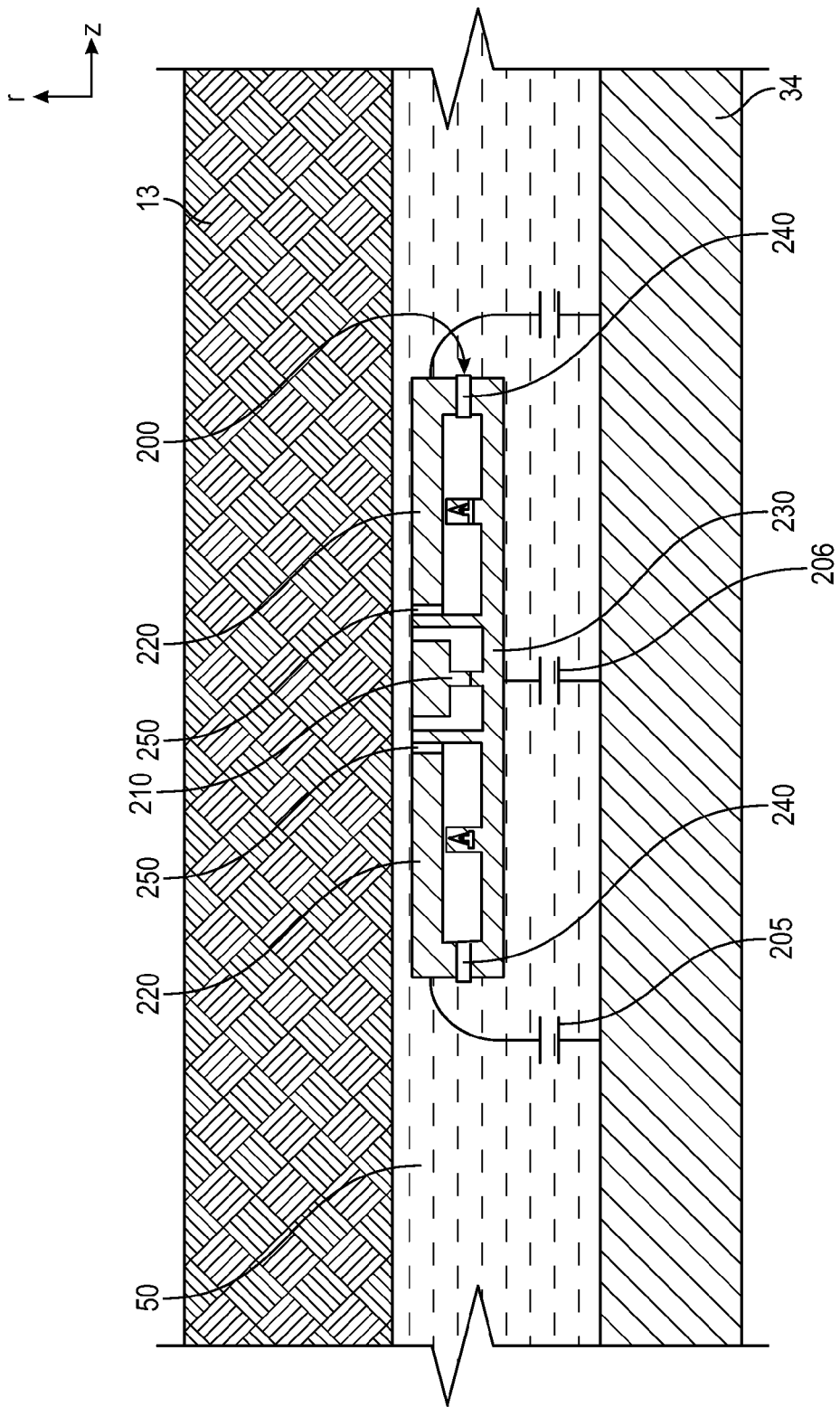
FIG. 2 shows a schematic of an exemplary imaging tool according one embodiment of the present disclosure.

FIG. 2 shows a schematic side view of a pad 200 of an exemplary borehole sidewall imager system 10. A resistivity array 26 may include one or more pads 200. The pad 200 may be secured to extendable arms such as 205. The extendable arms 205 may be conductive, partially conductive, or non-conductive. The extendable arms 205 are represented by a capacitance symbol to indicate the capacitance between a portion of the pad 200 and a mandrel 34. Hydraulic or spring-loaded caliper-arm actuators (not shown) of any well-known type extend the pads and their electrodes against the borehole sidewall for resistivity measurements. In addition, the extendable caliper arms 205 provide the actual measurement of the borehole diameter as is well known in the art. Electronics modules (not shown) may be located at suitable locations in the system. The components may be mounted on a mandrel 34 in a conventional well-known manner. The pad 200 may include one or more measure (sense) electrodes 210 for receiving electric currents into the earth formation. The pad 200 may also include one or more transmitters 220 for injecting electric currents into the earth formation. Measure electrode 210 may be electrically coupled to a back plate 230. The back plate 230 may be electrically isolated from the mandrel 34 and the transmitters 220 by isolators 240, 250. Isolators 240, 250 may be comprised at least in part of an insulating material or a physical gap. In some embodiments, an optional extendable arm 206 may secure the back plate 220 to the mandrel 34. Optional extendable arm 206, represented by a capacitance symbol, may be conductive, partially conductive, or non-conductive. The transmitters 220 and the mandrel 34 may be electrically coupled, which may result in the mandrel 34 being connected with the transmitters 220 in parallel, and, thus, reducing the parasitic effect of the current leaking to the measure electrode 210 from the mandrel 34. In some embodiments, the measure electrode 210 may be maintained at zero potential (grounded). It should further be noted that in the example shown in FIG. 2, only a single button electrode shown. In another embodiment of the disclosure, a single pad may include an array of button electrodes. The array may be a linear array oriented along a longitudinal axis of the tool, a linear array oriented along a transverse axis of the tool, or a two dimensional array. Any of these configurations may be used to provide an image of a resistivity property of the earth formation.

Imaging tool 10 may also include an optional biasing element (not shown), which may have a voltage impressed upon it to influence the path that electric current may use while the pad 200 is active and which may be part of the exterior of the imaging tool 10 or located elsewhere along the carrier 14.

Figure 3:
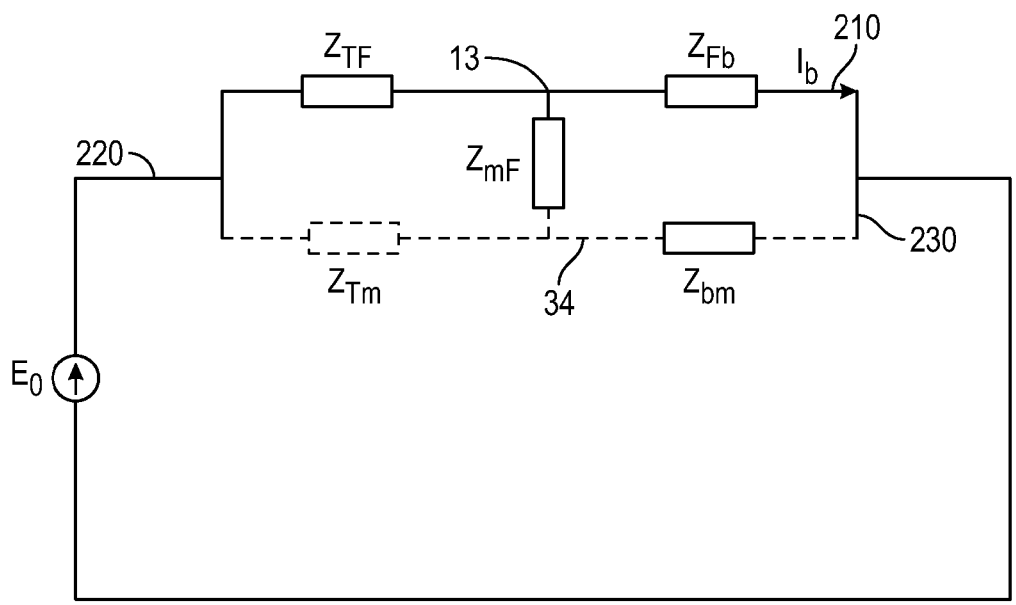
FIG. 3 shows an equivalent circuit diagram of the imaging tool according one embodiment of the present disclosure.

FIG. 3 shows an equivalent circuit diagram corresponding to the schematic of FIG. 2. Herein, $E_0$ is the voltage applied by the transmitters 220. The impedance between the transmitter 220 and formation 13, $Z_{TF}$, may be comprised of capacitance, $C_T$, between the transmitters 220 and a formation 13 (standoff) and resistance, $R_T$, which depends on the resistivity of the formation 13 against the transmitters 220 and area of the transmitters 220. The impedance between the measure (button) electrode 210 and the formation 13, $Z_{Fb}$, may be comprised of the capacitance, $C_b$, between the transmitters 220 and a formation 13 (standoff) and resistance, $R_F$, which may depend on the resistivity of formation and the transmitter. The impedance between the mandrel 34 and formation 13, $Z_{mF}$, may be comprised of capacitance, $C_m$, between the mandrel and formation and resistance, $R_m$, which may depend on the resistivity of formation, frequency, and geometry of the pad 200. There may also be some impedance between transmitter 220 and mandrel 34, $Z_{Tm}$, as well as, some impedance between the back plate 230 and mandrel 34, $Z_{bm}$. Impedance $Z_{Tm}$ may depend on the connection between transmitter 220 and mandrel 34, while $Z_{bm}$ may be defined as the impedance between back plate 230 and mandrel 34. The pad 200 may be configured to measure electric currents through the measure electrode 210, $I_b$, and the applied voltage that are converted into the impedances. When the pad 200 is provided with a plurality of electrodes, and image of a resistivity parameter of the formation may be obtained. For the present disclosure, the following definition of "image" is adopted:

A two-dimensional display, using colors or different gray scales, of the resistivity parameter around the borehole against depth. The x-axis of the image shows different segments of the borehole displayed from the top of the hole clockwise around through the bottom and back to the top again. Depth is in the z-axis, while the values of the resistivity parameter are represented by different colors or changes from black to white.

The reduction in current leakage may be understood through an analysis of the circuit of FIG. 3. If $Z_{Tm}$ is assumed to be zero while $Z_{bm}$ is set to infinity, then, by definition, for the impedances between formation and transmitter $Z_{TF}$, between formation and measure electrode (button) $Z_{Fb}$, and between formation and mandrel $Z_{mF}$ may be expressed as:

$$Z_{TF} = R_T + \frac{1}{j\omega C_T} = R_T - jX_T \quad (1)$$

$$Z_{Fb} = R_F + \frac{1}{j\omega C_b} = R_F - jX_b$$

$$Z_{mF} = R_m + \frac{1}{j\omega C_m} = R_m - jX_m$$

Then the current through the button $I_b$ may be expressed as:

$$I_b = \frac{E_0}{Z_b + \frac{Z_m Z_T}{Z_m + Z_T}} \quad (2)$$

and for the measured impedance Z may become:

$$Z = Z_b + \frac{Z_m Z_T}{Z_m + Z_T} \quad (3)$$

From (1) and (3), after simple algebraic manipulations, the real and imaginary parts of the impedance Z may be derived:

$$Re(Z) = R_F + \frac{(R_m R_T + X_m X_T)(R_m + R_T) + (X_m R_T + R_m X_T)(X_m + X_T)}{(R_m + R_T)^2 + (X_m + X_T)^2} \quad (4)$$

$$Im(Z) = \quad (5)$$
$$-jX_b - \frac{(X_m R_T + R_m X_T)(R_m + R_T) + (R_m R_T + X_m X_T)(X_m + X_T)}{(R_m + R_T)^2 + (X_m + X_T)^2}$$

Assuming $X_m \ll X_T$, $R_m \ll R_T$ and $R_T \ll X_T$, then $$Re(Z) \approx R_F + R_m \quad (6)$$

$$Im(Z) \approx -j(X_b + X_m) \quad (7)$$

In case when $X_n \gg X_T$ and $R_m \gg R_T$ for $Re(Z)$ and $Im(Z)$ we have $$Re(Z) \approx R_F + R_T \quad (8)$$

$$Im(Z) \approx -j(X_b + X_T) \quad (9)$$

Using equations (6) and (8), it will be understood, to one of skill in the art and having benefit of the present disclosure, that, under either of the described assumptions, the real part of the impedance does not depend on the standoff, which is unlike the case with impedance when the transmitters are electrically isolated from the mandrel, where a quadratic dependence on the standoff may be observed. Additionally, the parasitic impedance in equations (6) and (7) is always positive, and the real part of the impedance cannot have negative readings. By analyzing equation (4), it will be understood by those of skill in the art that the transmitter impedance $Z_T$ reduction may lead to a reduction of the parasitic terms affecting the real part of the impedance and, thus, an increase of sensitivity to the resistivity of formation $R_F$.

Figure 4:
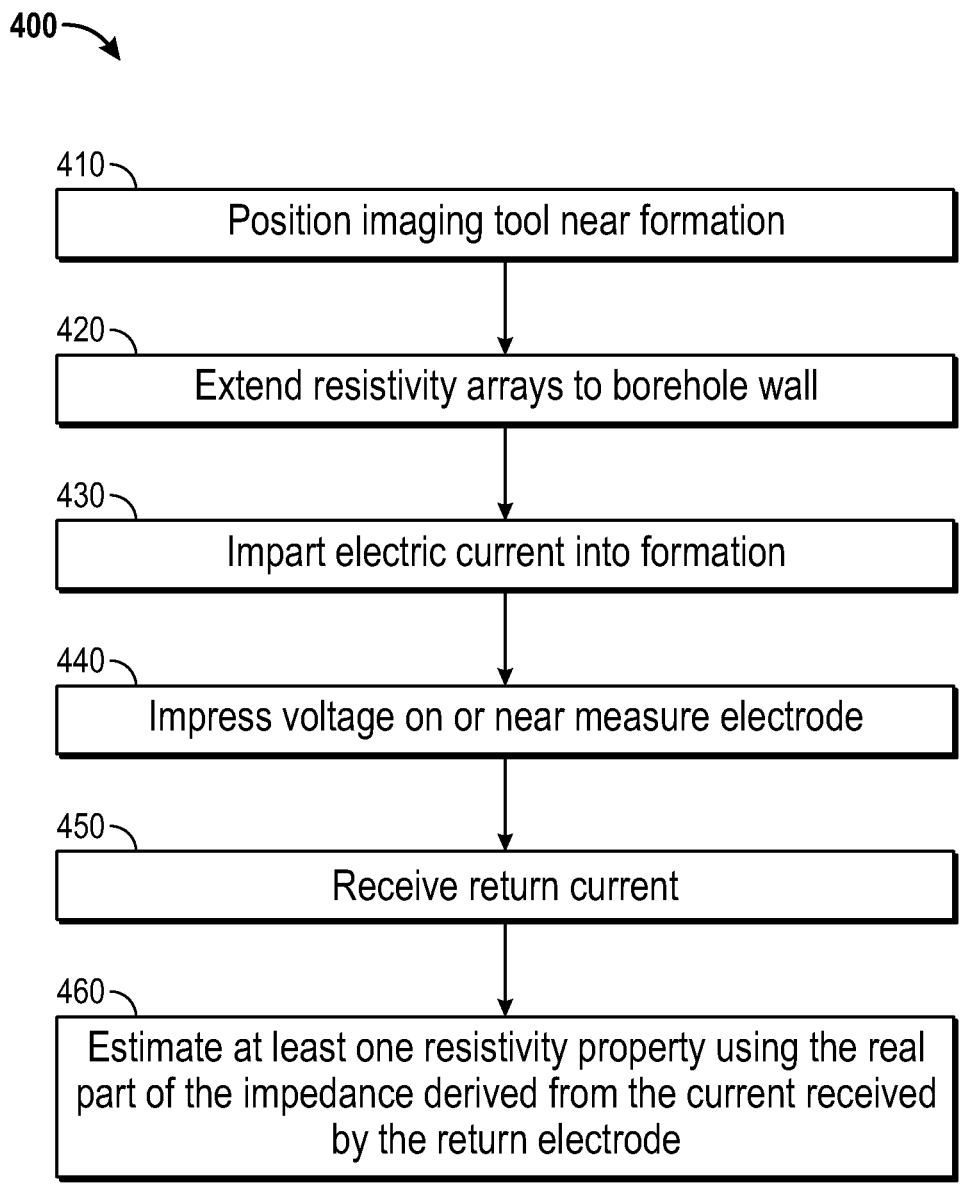
FIG. 4 shows a flow chart of a method for performing resistivity imaging with reduced current leakage from the formation to the mandrel according to one embodiment of the present disclosure.

FIG. 4 shows an exemplary method 400 according to one embodiment of the present disclosure. In method 400, an imaging tool 10 is positioned within a borehole 12 adjacent to an earth formation 13 in step 410. Then, in step 420, resistivity arrays 26 are extended to the borehole wall 12. In step 430, an electric current may be imparted into the formation 13 through at least one transmitter 220. In step 440, a voltage may be impressed on the on or near the return electrode 210. In some embodiments, step 440 may not be performed. The transmitter 220 may be electrically coupled to the mandrel 34, and the at least one measure electrode 210 may be electrically coupled to a back plate 230, where the back plate 230 and the mandrel 34 are electrically isolated from each other. In some embodiments, the sum of the area of the transmitters 220 may be sized such that a ratio between the sum of the area of the transmitters 220 to the total surface area of the buttons may be sufficient to reduce a current leakage from the earth formation 13 to the mandrel 34. A sufficient reduction may include reducing current leakage such that a suitable image may be obtained using a return current (step 450) as understood by one of skill in the art. In some embodiments, the sum of the area of the transmitters 220 may be sized to have a surface area of about 5 times or more of the total surface area of the buttons 210. In step 450, a return current from the formation due to the imparted current may be received by at the measure electrode 210. The relationship between a voltage of the measure electrode 210 and the imparted current may be expressed as a complex impedance. In step 460, at least one resistivity property may be produced using the real part of the impedance derived from the current received by the measure electrode 210. In some embodiments, a resistivity image may be produced using a plurality of the real parts of impedances. Method 400 may be performed using multiple measure electrodes sequentially or simultaneously.

Figure 5:
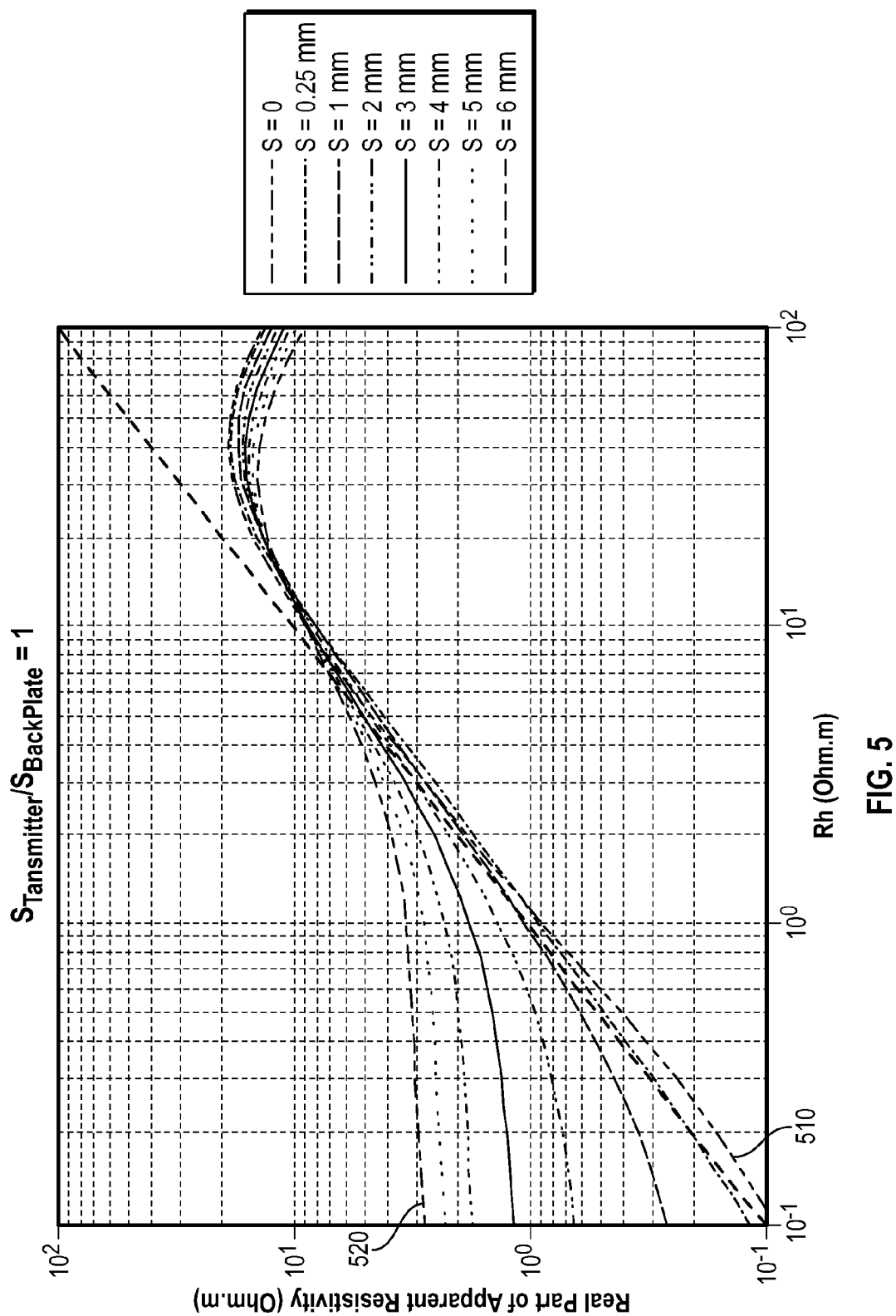
FIG. 5 shows a graph representing the real part of resistivity versus the total resistivity at different standoff distances when the surface area of the on-pad transmitter is about 5 times bigger than the total area of the buttons using one embodiment of the present disclosure.
Figure 6:
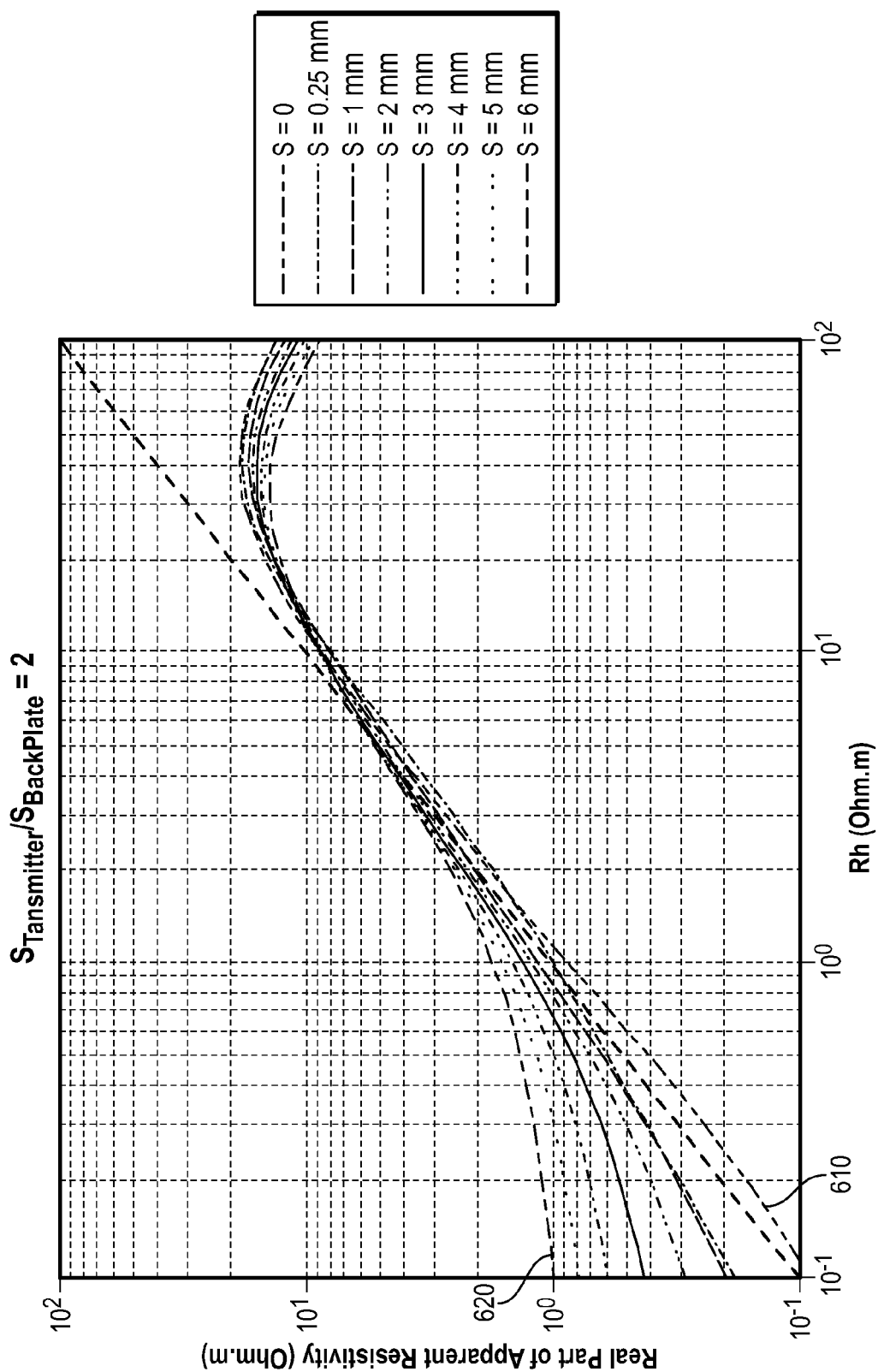
FIG. 6 shows a graph representing the real part of resistivity versus the total resistivity at different standoff distances when the surface area of the on-pad transmitter is about 10 times bigger than the total area of the buttons using one embodiment of the present disclosure.

FIG. 5 is a graph showing curves depicting the real part of apparent resistivity against the formation resistivity at different standoff distances using pad 200 when the surface area of the transmitter 220 is 5 times the total surface area of the buttons 210. The curves show results for standoffs ranging from 0 mm 510 to 6 mm 520. FIG. 6 is a graph showing curves depicting the real part of apparent resistivity against the formation resistivity at different standoff distances using pad 200 when the surface area of the transmitter 220 is 10 times the total area of the buttons 210. The curves show results for standoffs ranging from 0 mm 610 to 6 mm 620. FIG. 7 is a graph showing curves depicting the real part of apparent resistivity against the formation resistivity at different standoff distances using pad 200 when the surface area of the transmitter 220 is 20 times the total surface area of the buttons 210. The curves show results for standoffs ranging from 0 mm 710 to 6 mm 720. It can be seen from these curves that, in the range of $R_t$ from 0.5 to 20 ohmm, the increase of the surface area of the transmitter 220 relative to the surface area of the sensing buttons may lead to improved linearity of apparent resistivity on the resistivity of formation $R_t$. Also, the increase of the surface area of the transmitter 220 may lead to a reduction of apparent resistivity on the standoff. In the examples shown in FIGS. 5-7, the capacitance $C_{bm}$ is about 40 picofarads and there is infinite capacitance between transmitter and mandrel (galvanic connection between transmitter and mandrel). Sensitivity of the imager to the formation resistivity may be improved by maintaining a ratio between the impedance $Z_{bm}$ and $Z_{Tm}$ sufficient to reduce current leakage between the earth formation 13 and the mandrel 34 such that a suitable image may be obtained using the return current, as understood by one of skill in the art. In some embodiments, the sensitivity of the imager to the formation resistivity may be improved by maintaining a ratio between impedances $Z_{bm}$ and $Z_{Tm}$ of about 10 or more. The following two examples illustrate the validity of this statement.

FIGS. 8-10 showing graphs with curves depicting the real part of apparent resistivity against the total resistivity at different standoff distances using pad 200 when the surface area of the transmitter 220 is 10 times the total surface area of the buttons 210 and the transmitter-mandrel capacitance, $C_{TM}$, and button-mandrel capacitance, $C_{BM}$, are varied. FIG. 8 shows a graph with curves depicting the real part of apparent resistivity against the formation resistivity at different standoff distances using pad 200 when capacitance $C_{Tm}$, is reduced to 40 picofarads while capacitance $C_{bm}$ is equal to 4 picofarads. The curves show results for standoffs ranging from 0 mm 810 to 6 mm 820. FIG. 9 shows a graph with curves depicting the real part of apparent resistivity against the formation resistivity at different standoff distances using pad 200 when capacitance $C_{Tm}$ is reduced to 400 picofarads while capacitance $C_{bm}$ is equal to 40 picofarads. In both cases apparent resistivity is almost linear over a range of formation resistivity and standoffs. In this example, the apparent resistivity is linear when resistivity of formation $R_t$ is in the range of $R_t$ above (0.5-20) ohmm and standoff is below 4 mm. The linearity may decrease as the when ratio X decreases. The curves show results for standoffs ranging from 0 mm 910 to 6 mm 920. FIG. 10 shows a graphs with curves depicting the real part of apparent resistivity against the formation resistivity at different standoff distances using pad 200 when capacitance $C_{Tm}$ is reduced to 40 picofarads while capacitance $C_{bm}$ is equal to 40 picofarads. An increase of impedance $Z_{Tm}$ triggered leakage through the mandrel may cause sensitivity of the imager to the standoff to increase. The curves show results for standoffs ranging from 0 mm 1010 to 6 mm 1020. Under the conditions used in the embodiment shown in FIG. 10, it can be understood that only curves corresponding to 1 mm and less maintain linear dependency of the apparent resistivity on resistivity of formation in the range of $R_t$>(0.5-20) ohmm.

Implicit in the processing of the data is the use of a computer program implemented on a suitable non-transitory machine readable medium that enables the processor to perform the control and processing. The term processor as used in this application is intended to include such devices as field programmable gate arrays (FPGAs). The non-transitory machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable non-transitory machine readable medium.

While the foregoing disclosure is directed to the one mode embodiments of the disclosure, various modifications will be apparent to those skilled in the art. It is intended that all variations be embraced by the foregoing disclosure.

We claim:

1. An apparatus configured to evaluate an earth formation penetrated by a borehole having a non-conducting fluid therein, the apparatus comprising:
    a carrier;
    a logging tool disposed on the carrier, the logging tool comprising:
        a pad body;
        at least one transmitter disposed on the pad body; and
        at least one measure electrode electrically isolated from the at least one transmitter and a body of the logging tool;
        wherein a ratio between (i) an area of the at least one transmitter and (ii) an area of the at least one measure electrode and a ratio between (i) an impedance between the pad body and the body of the logging tool and (ii) an impedance between the at least one transmitter and the body of the logging tool are both sufficient to reduce a current leakage from the earth formation to the body of the logging tool; and
    at least one processor configured to estimate a resistivity parameter of the earth formation using an impedance determined from a current at the at least one measure electrode and a potential of the at least one transmitter.

2. The apparatus of claim 1, wherein the ratio between the area of the at least one transmitter and the area of the at least one measure electrode is about 5 or more, and the ratio between the impedance between the pad body and the body of the logging tool and the impedance between the at least one transmitter and the body of the logging tool is about 10 or more.

3. The apparatus of claim 1, further comprising:
    a power source in electrical communication with the at least one transmitter and configured to provide an electric voltage to the at least one measure electrode.

4. The apparatus of claim 3, wherein the power source is disposed in the logging tool.

5. The apparatus of claim 1, wherein the carrier is one of: (i) a wireline, and (ii) a drilling tubular.

6. The apparatus of claim 1, wherein the at least one transmitter comprises a plurality of transmitters and wherein the resistivity parameter estimated by the at least one processor further comprises an image of the earth formation.

7. The apparatus of claim 6 wherein the pad body is configured to be extended from the carrier.

8. The apparatus of claim 1, further comprising:
    a back plate in electrical communication with the at least one measure electrode and electrically isolated from the at least one transmitter.

9. The apparatus of claim 1, further comprising:
    one or more electrical isolators disposed between the at least one measure electrode and the at least one transmitter.

10. A method of evaluating an earth formation penetrated by a borehole having a non-conducting fluid therein, the method comprising:
    conveying a logging tool disposed on a carrier into the borehole, the logging tool comprising:
        a pad body,
        at least one transmitter disposed on the pad body, and
        at least one measure electrode electrically isolated from the at least one transmitter and a body of the logging tool;
    maintaining a ratio between an impedance between the pad body and the body of the logging tool and an impedance between the at least one transmitter and the body of the logging tool and a ratio between an area of the at least one transmitter and an area of the at least one measure electrode that are both sufficient to reduce a current leakage from the earth formation to the body of the logging tool;

receiving an electric current with the at least one measure electrode; and estimating a resistivity parameter of the earth formation using an impedance determined from the electric current and a potential of the at least one transmitter.

11. The method of claim 10, wherein the ratio between the area of the at least one transmitter and the area of the at least one measure electrode is about 5 or more, and the ratio between the impedance between the pad body and the body of the logging tool and the impedance between the at least one transmitter and the body of the logging tool is about 10 or more.

12. The method of claim 10, further comprising:
electrically isolating the at least one measure electrode from the carrier.

13. The method of claim 10, further comprising
injecting an electric current into the earth formation.

14. The method of claim 10, further comprising:
providing an electric voltage to the at least one measure electrode.

15. The method of claim 10, using, to provide the electric voltage, a power supply disposed in the logging tool.

16. The method of claim 10, wherein the at least one transmitter comprises a plurality of transmitters and wherein the resistivity parameter further comprises an image.

* * * * *